United States Patent [19]

Kozuki et al.

[11] 4,171,892

[45] Oct. 23, 1979

[54] CAMERA WITH A MOTOR DRIVE UNIT

[75] Inventors: Susumu Kozuki, Yokohama; Akio Sunouchi, Tokyo; Yoshiaki Watanabe, Fujisawa, all of Japan

[73] Assignee: Canon Kabushiki Kaisha, Tokyo, Japan

[21] Appl. No.: 766,739

[22] Filed: Feb. 8, 1977

[30] Foreign Application Priority Data

Feb. 13, 1976 [JP] Japan ................................ 51/14457

[51] Int. Cl.² ............................ G03B 1/18; G03B 1/00
[52] U.S. Cl. .................................. 354/173; 354/214
[58] Field of Search ............... 354/170, 171, 172, 173, 354/214, 204; 352/96, 124; 242/71.6

[56] References Cited

U.S. PATENT DOCUMENTS

| | | | |
|---|---|---|---|
| 3,598,033 | 8/1971 | Seesaki | 354/214 |
| 3,735,683 | 5/1973 | Umeda | 354/173 X |
| 3,783,762 | 1/1974 | Sugimori | 354/173 |
| 3,981,022 | 9/1976 | Iwashita et al. | 354/171 |
| 3,999,197 | 12/1976 | Iwashita | 354/173 |

FOREIGN PATENT DOCUMENTS 472105  9/1937  United Kingdom ................ 354/204

Primary Examiner—Donald A. Griffin
Attorney, Agent, or Firm—Toren, McGeady and Stanger

[57] ABSTRACT

In a camera adapted for use with a motor drive unit capable of selectively controlling film winding and rewinding operations, there are provided first and second driving torque input means, the first input means being positioned for continual engagement with a film winding up mechanism, and the second input means being arranged upon setting movement of a manually operated rewinding knob to attain driving engagement with a rewinding shaft and being located outside a film cartridge chamber to insure the protection of the film from fogging. The motor drive unit has a pair of output means connected through respective directionally-responsive clutches to a common motor and arranged upon attachment to the camera to engage the respective input means of the camera and has a single operating member for selectively actuating each of the output means for the film winding and rewinding operation.

8 Claims, 3 Drawing Figures

CAMERA WITH A MOTOR DRIVE UNIT

BACKGROUND OF THE INVENTION

1. Field of the Invention

This invention relates to photographic cameras adapted to be attachable to and detachable from motor drive units for selectively driving each of the film winding up and rewinding mechanisms, and more particularly to a motor driven camera having a provision for protecting the loaded film from fogging which might be otherwise encountered when the effective combination of the camera body and the motor drive unit therefor is established or broken.

2. Description of the Prior Art

A wide variety of motor driven cameras have been developed including, for example, the one in which the camera body and the motor drive unit are formed in unison, and the one in which the effective combination of the camera body and the motor drive unit may be established or broken as desired. In the latter connection there are two types, one of which is to motor-drive only the film winding up mechanism while the rewinding mechanism is manually operated, and another type which is to selectively motor-drive each of the film winding and rewinding mechanisms.

Of these, the first named motor driven camera has many disadvantages from the standpoint of the camera systematization which enables the user to apply the camera in the optimum form with respect to the given photographic situation. This type of camera is also inconvenient in application to photography requiring manual operations based on the photographer's personal experience and insight. The second type of camera in which only the film winding up operation is performed by the motor drive unit, though having an advantage of enabling the user to couple the camera body and the motor easily and also to carry out either of the coupling and decoupling at a desired time with no probability of causing the loaded film to be fogged, is inconvenient when the necessity of a rapid rewinding operation is encountered.

The last mentioned or third type is most suited to the camera systematization from the points of view that either of the film having and rewinding operations can be selectively carried out by motor driving control and that the camera body and the motor drive unit may be coupled to, or decoupled from each other at a desired time. The conventional motor driven camera of this type has, however, a disadvantage that the coupling of the motor drive unit to the camera body requires somewhat time-consuming manipulation because a drive motion output shaft of the unit must be inserted through a hole provided in the bottom wall of the camera housing into a take-up spool of the film cartridge. Another disadvantage is that after the camera is loaded with a cartridge, it is impossible to decouple the unit from the camera body without causing the film to be fogged, as a light leak to the cartridge chamber occurs through the hole. If the user comes to desire a manual operation at a time during the motor driven operation, therefore, he must perform the manual operation while still permitting the camera to remain coupled with the motor drive unit. Thus, the design feature for the possibility of detaching the unit from the camera is lost. In this case, the user is also suffered from trouble about keeping the light-shielding cover for the hole for fear it is lost during the motor driven operation.

As the take-up spool of the film cartridge is driven for rotation while being supported between an upper shaft cooperating with a manually operable rewinding knob and a lower shaft, that is, the drive motion output shaft of the unit, an offset between the upper and lower shaft axes is liable to occur. If so, smooth rewinding operation is difficult to perform. After the rewinding operation is completed to take the cartridge out of the camera, the user needs to disengage not only the upper but the lower rewinding shaft from the spool of the cartridge. Such handling is somewhat troublesome and complex. Further, the provision for admitting the disengaging movement of the lower rewinding shaft must be made within the housing of the motor drive unit by means of a relatively large spare space. This is disadvantageous for the limitation of the size of the unit to a minimum.

An object of the present invention is to provide a motor driven camera system which has overcome the above mentioned conventional drawbacks.

Another object is to provide a camera adapted for use with a motor drive unit capable of selectively driving each of the film winding up and rewinding mechanisms of the camera and which enables the user to perform the attachment and detachment of the motor drive unit to and from the camera body by easy and simple manipulation at a desired time while still permitting the camera to be loaded with the film, as there is no possibility of causing the film to be fogged.

Still another object is to provide a camera of the character described capable of smooth automatic rewinding operation which is not affected by the accuracy of location of the drive motion output shaft of the unit attached to the camera.

These and other objects and features of the present invention will become more fully apparent from the following detailed description taken in conjunction with the accompanying drawings in which:

DESCRIPTION OF THE PREFERRED EMBODIMENT

Figure 1:
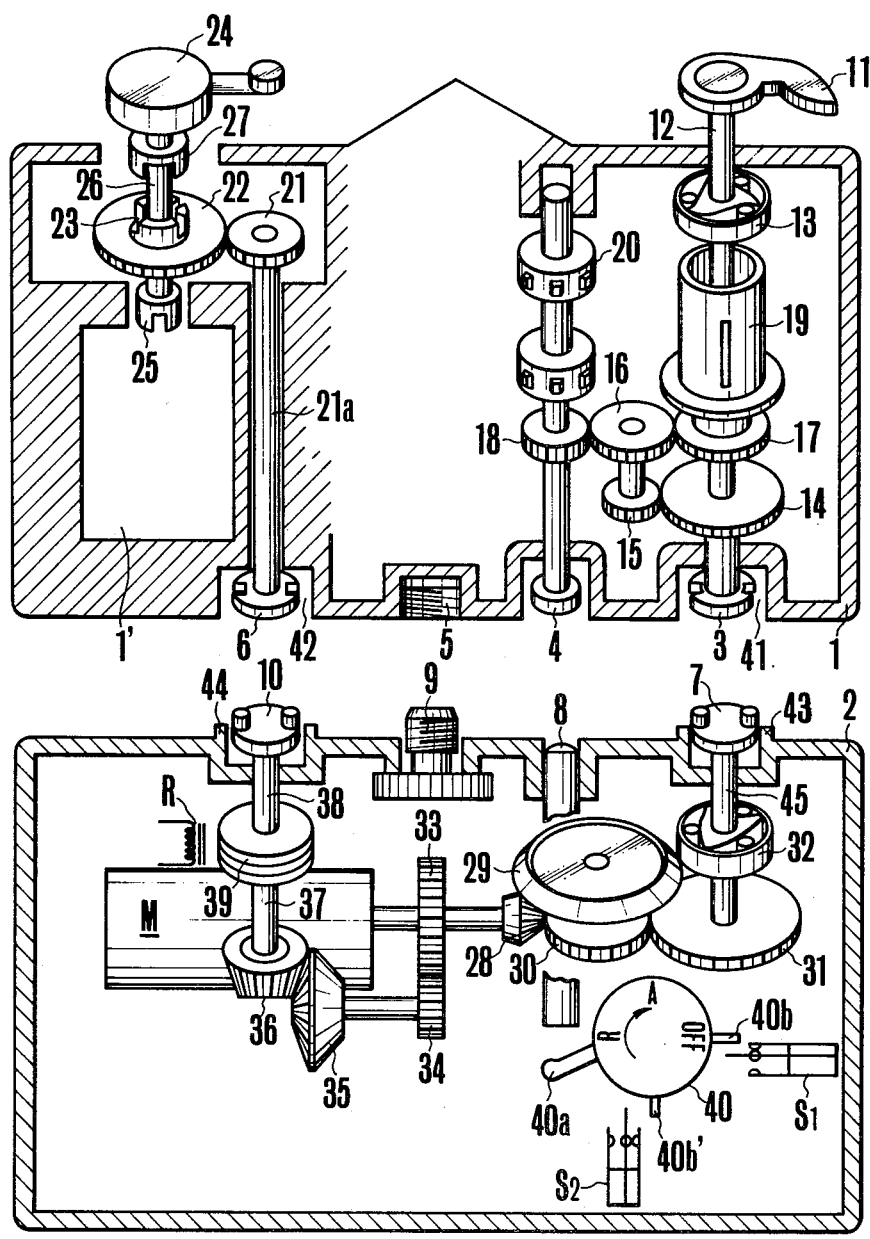
FIG. 1 is a schematic perspective view of one embodiment of a motor driven camera system according to the present invention wherein a camera is shown as being about to be attached to a motor drive unit.

Referring to FIG. 1, there is shown one embodiment of a motor driven camera system comprising a camera 1 and a motor drive unit 2 which can be assembled with each other in fixedly secured relation when an internal screw-mount 5 for a tripod provided in the bottom wall of the camera housing at a center thereof is engaged with an external screw 9 rotatably extending from the top wall of the unit housing. The camera 1 has a film winding coupler 3 and a film rewinding coupler 6 positioned in respective recessed portions 41 and 42 of the bottom wall of the camera housing and arranged upon attachment to the unit 2 to engage with respective drive couplers 7 and 10 axially shiftable within respective recessed portions 43 and 44 formed in the top wall of the unit housing.

The winding coupler 3 constitute part of first driving torque input means positioned for continual engagement with a film winding up mechanism of the camera. This mechanism which may be of conventional structure comprises a film winding lever 11 fixedly carried at the top end of an upper section of a winding shaft 12, a mechanical one-way clutch 13 intervening between the upper and lower sections of the winding shaft 12, a gear train 16, 17, 18, a sprocket 20 arranged to be rendered ineffective with respect to the film when the motor drive unit is switched to the rewinding operation mode as a release button 4 mounted at the bottom end of the sprocket shaft is acted on by an actuator pin 8 therefor, and a film take-up reel 19 coaxial to the winding shaft 12. The first input means further includes a gear 14 and a pinion 15 meshing with the gear 14 and fixedly mounted on the common shaft of the gear 16.

The film rewinding coupler 6 constitutes part of second driving torque input means positioned for driving engagement with a film rewinding mechanism. This mechanism comprises a manually operable rewinding knob 24 fixedly mounted on a rewinding shaft 26 at the top end thereof, the opposite end of which carries a forked portion 25 arranged upon setting movement of the rewinding shaft 26 to engage with a take-up spool of a film cartridge not shown as the cartridge is properly seated in a chamber 1'.

The second driving torque input means is constructed as comprising a shaft 21a disposed outside the cartridge chamber 1' in parallelism with the rewinding shaft 26 and fixedly carrying the rewinding coupler 6 at the bottom end thereof, the opposite end of which fixedly carries a gear 21 meshing with a larger gear 22 rotatably mounted on the shaft 26. The gear 22 is provided with an adapter piece 23 coaxially extending from the upper surface thereof and designed to join the gear 22 with the shaft 26 through a toothed collar 27 fixedly mounted on the shaft 26.

The motor drive unit 2 includes an electric motor M having an output shaft of which motion is transmitted to the coupler 7 through a gear train 28 to 31 and through first directionally-responsive clutch, in this instance, a mechanical one-way clutch 32 only when the direction of rotation of the motor output shaft is normal for film winding up operation. When this direction is reversed by turning a control knob 40 to place a symbol "R" in registry with a not shown index, an exciter coil R is energized to actuate a second clutch 39 so that the motion of motor output shaft is transmitted through a gear train 33 to 36 and the second clutch 39 to the coupler 10. The camera control knob 40 is provided in the motor drive unit and has three switched positions including a position A (film winding up) and a position R (film rewinding) where an arm 40a extending from the knob shaft is in upward pressing contact with the actuator pin 8 while the other two arms 40b and 40b' are acted on respective movable contacts of switch elements $S_1$ and $S_2$.

Figure 2:
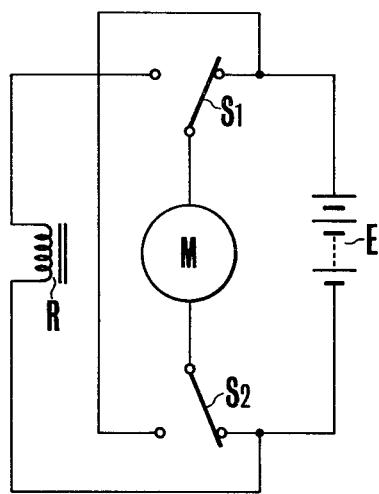
FIG. 2 is a circuit diagram of the motor drive unit of FIG. 1 with a switch arrangement for controlling direction of rotation of an electric motor with simultaneous control of an electromagnetically-acted directionally-responsive clutch.

FIG. 2 shows an example of arrangement of the switch elements $S_1$ and $S_2$ in the circuit for selectively controlling the directions of rotation of the motor M with simultaneous selective control of the energization and deenergization of the exciter coil R. When the switch elements $S_1$ and $S_2$ are in the illustrated positions, the direction of rotation of the motor M is normal with the deenergization of the exciter coil R. When the control knob 40 of FIG. 1 is switched from "A" position to "R" position, both of the switch elements $S_1$ and $S_2$ are operated so that the motor M rotates in the reverse direction and that the exciter coil R is energized to render the second clutch 39 operative.

Figure 3:
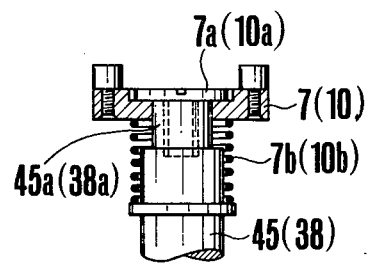
FIG. 3 is a fragmentary elevational view of a coupler provided in the motor drive unit of FIG. 1.

In order to insure that the input couplers 3 and 6 are reliably jointed with the respective output couplers 7 and 10 when the camera is attached to the motor drive unit, there are provided retaining projections upwardly extending from respective recessed portion walls 43 and 44 and so dimensioned as to exactly fit into respective recessed portions 41 and 42 of the camera housing. Again, in order to automatically effect the driving engagement between the film winding input and output couplers 3 and 7 and between the rewinding input and output couplers 6 and 10, each of the output couplers 7 and 10 is constructed, taking for example the film winding drive output coupler 7, from a disk axially movable along an end portion 45a of the drive shaft 45 of FIG. 1 while being prevented from rotative movement relative to the shaft 45 and biased by a compression spring 7b to tend for upward movement until it abuts against a head of a crew-bolt fastener 7a affixed to the shaft 45 at the top end surface thereof as shown in FIG. 3. With these output couplers 7 and 10, when the camera 1 is attached to the motor drive unit 2 without occurrence of the effective driving engagement between the input and output couplers 7 and 3, or 6 and 10, the output coupler 7 or 10 is moved downwardly against the force of spring 7b or 10b. Then the motor M may be energized to drive either of the output couplers 7 and 10 for rotation, whereby the effective driving engagement between the input and output couplers 3 and 7, or 6 and 10 can be established within a half revolution thereof, as the output coupler 7 or 10 coincides in phase with the input coupler 3 or 6 respectively.

The operation of the motor driven camera system of FIGS. 1 to 3 is as follows: When a single frame exposure or a continuous succession of frame exposures is to be made, the user may turn the control knob 40 to place the symbol A in registry with a not shown index, thereby the switch elements $S_1$ and $S_2$ are set to the illustrated positions of FIG. 2 as the actuating arms 40b and 40b' are taken out of the movable contacts of $S_1$ and $S_2$. Upon depression of a shutter release button of the camera, the motor M is operated to rotate in the normal direction so that the film is transported past the exposure station to the take-up reel 19. After a predetermined number of frames have been exposed, the user may turn the control knob 40 to place the symbol "R" in registry with the index, thereby the sprocket 20 is released from engagement with the film by the arm 40a, and simultaneously the switch elements $S_1$ and $S_2$ are set from the illustrated positions to the opposite positions where the electromagnetic clutch 39 is rendered operative to transmit the reversed motion of the motor to the rewinding output coupler 10, while the first clutch 32 does not transmit this reversed motion to the output coupler 7. As the driving torque of the output coupler 10 is transmitted to the second input means 21, 21a, 22 and 23, upon depression of the rewinding control knob 24, the rewinding shaft 26 is driven for rotation with the simultaneous rotation of the spool in the film cartridge through engagement with the forked portion 25, thereby the film is rewound in, as the take-up reel 19 supplies the exposed portion of the film.

Although the above mentioned embodiment employs a mechanical one-way clutch for the part 32 and an electromagnetic clutch for the part 39, the present invention is not confined thereto. It is possible to use an electromagnetic clutch for the part 32 and a mechanical one-way clutch for the part 39. Further it is possible for the both parts 32 and 39 to be either of electromagnetic clutches, or of mechanical one-way clutches.

It will be seen from the foregoing description that the present invention provides a motor driven camera system of which the camera has no hole which is otherwise necessary at the bottom wall of the cartridge chamber to receive the rewinding drive shaft of the motor drive unit as in the prior art, so that there is no probability of occurrence of light leak into the chamber and that the camera may be attached to and detached from the unit independently of whether or not the camera is loaded with film. As the automatic rewinding operation is performed by utilizing the intrinsic rewinding shaft of the camera, no offset between the upper and lower shafts for the cartridge spool occurs to result in smooth rewinding operation. Further, the procedure for attaching or detaching the camera to or from the motor drive unit is very simplified while still effecting accurate adjustment of the relative positions therebetween.

What is claimed is:

1. A camera capable of having a film rewinding device attached thereto and detached therefrom, comprising:
   an engaging member for film rewinding, said engaging member being capable of engaging a film magazine when the camera is loaded with the film magazine;
   an actuation member provided in the upper part of the camera for actuating said engaging member;
   an operating member which operates by manual operation thereof to actuate said actuation member;
   a first transmission member operatively associated with said actuation member;
   a second transmission member operatively associated with said first transmission member, said second transmission member being disposed in the upper part of the camera together with said first transmission member;
   a rewinding coupler positioned at the bottom of said camera; and
   a coupling member which connects said rewinding coupler to said second transmission member, said rewinding coupler being engaged with a drive coupler of the film rewinding device as the film rewinding device is attached to the camera, the action of the drive coupler being arranged to be transmitted to said engaging member through said rewinding coupler, said coupling member, first and second transmission members and said actuation member.

2. A camera according to claim 1, wherein said first and second transmission members are first and second gears engaging with each other.

3. A camera capable of having a film rewinding device attached thereto and detached therefrom, comprising:
   an engaging member for film rewinding, said engaging member being shiftable between a first position in which it is capable of engaging a film magazine loaded in said camera and a second position in which it is incapable of engaging said film magazine;
   operation means disposed in the upper part of the camera to permit manual shifting of said engaging member between said first position and said second position and also to permit a manual rotating action for film rewinding;
   an intermediate member which interlocks said operation means with said engaging member;
   a first transmission member which transmits to said engaging member through said intermediate member an operating force for rewinding;
   a clutch provided between said first transmission member and said intermediate member, said clutch being arranged to transmit the action of said first transmission member to said intermediate member in response to the operation of said operation means effected to shift said engaging member to said first position thereof, said clutch also being arranged to avoid transmitting the action of said first transmission member to said intermediate member when said engaging member is shifted to said second position thereof by the operation of said operation means;
   a second transmission member operatively associated with said first transmission member, the second transmission member being disposed in the upper part of the camera together with said first transmission member;
   a rewinding coupler positioned at the bottom of said camera; and
   a coupler member which connects said rewinding coupler disposed at the bottom of the camera to said second transmission member disposed in the upper part of the camera;
   said rewinding coupler being engaged with a drive coupler of the film rewinding device as the film rewinding device is attached to the camera, the action of said drive coupler being transmitted to said engaging member through said rewinding coupler, said coupling member, said second transmission member, said first transmission member, said clutch and said intermediate member when said engaging member is shifted to the first position through operation of said operation means.

4. A camera capable of having a film winding and rewinding device attached thereto and detached therefrom, comprising:
   a camera body having:
   (a) an engaging member for rewinding, said engaging member being shiftable between a first position in which it is capable of engaging a film magazine loaded in said camera and a second position in which it is incapable of engaging said film magazine;
   (b) operation means disposed in the upper part of the camera to permit manual shifting of said engaging member between said first position and said second position and also to permit a manual rotating action for rewinding;
   (c) an intermediate member which interlocks said operation means with said engaging member;
   (d) a first transmission member which transmits an operating force for rewinding to said engaging member through said intermediate member;
   (e) a clutch provided between said first transmission member and said intermediate member, the clutch being arranged to transmit the action of said first transmission member to said intermediate member in response to the operation of said operation means effected to shift said engaging member fo said first position thereof, the clutch also being arranged to avoid transmitting the action of said first transmission member to said intermediate member when said engaging member is shifted to said second position by the operation of said operation means;

(f) a second transmission member operatively associated with said first transmission member, the second transmission member being disposed in the upper part of the camera together with said first transmission member;

(g) a rewinding coupler positioned at the bottom of the camera; and (h) a coupling member which connects said rewinding coupler disposed at the bottom of the camera to said second transmission member disposed in the upper part of the camera; and a film winding and rewinding device which is attachable to and detachable from said camera body, including:

(i) a rewinding member having a rewinding coupling which is engaged with said rewinding coupler;

(j) driving means to drive said rewinding member; and (k) driving control means for said driving means, the driving control means being provided with a switch for driving said driving means.

5. A camera according to claim 4, in which said rewinding member has elastic means to always press the rewinding coupling upward, said elastic means operating to render smooth the engagement of the rewinding coupling with the rewinding coupler.

6. A camera adapted to have a detachable film winding and rewinding device operably connected therewith having means for enabling loading within said camera of film means including film to be exposed by said camera and arranged for winding and rewinding therethrough, film winding means for effecting winding of said film through said camera in a first direction to enable exposure thereof, and film rewinding means adapted to alternatively enable rewinding of said film both manually and by said detachable film winding and rewinding device, said film rewinding means comprising: engaging means for engaging said film means loaded in said camera; actuation means operably engaging said engaging means to effect actuation thereof; manual operation means which operates by manual operation thereof to actuate said engaging means through said actuation means to effect manual rewinding of said film; transmission means operatively associated with said actuation means to effect actuation of said engaging means for film rewinding by said detachable film winding and rewinding device; rewinding coupler means located externally of said camera for detachable driving engagement with a drive coupler of said detachable film winding and rewinding device; coupling means drivingly interconnecting said rewinding coupler means and said transmission means; and light tight means through which said coupling means extends for enabling said rewinding coupler means to be engaged and disengaged with the drive coupler of said detachable film winding and rewinding device without undue exposure of film loaded in said camera.

7. A camera according to claim 6 wherein said film means is arranged within said camera for winding and rewinding of said film about a film axis and wherein said coupling means extends through said camera generally parallel to said film axis.

8. A camera according to claim 6 having a top part and a bottom with film means loaded within said camera being arranged for winding and rewinding of said film about a film axis, wherein said manual operation means and said transmission means are located in said top part of said camera and wherein said coupling means comprises a shaft extending generally parallel to said film axis and having a first end at the top thereof in operative engagement with said transmission means and a second end at the bottom thereof extending into operative engagement with said rewinding coupler means.

* * * * *